(12) United States Patent
Angelis et al.

(10) Patent No.: US 10,491,076 B2
(45) Date of Patent: Nov. 26, 2019

(54) BEARING DEVICE WITH ENERGY HARVESTING MEANS

(71) Applicants: Georgo Angelis, Oss (NL); Nicolaas Simon Willem Den Haak, Zwijndrecht (NL); Petrus Matheus Josephus Knapen, Tilburg (NL); Bernardus Johannes Meijer, Tilburg (NL); Andreas Clemens Van Der Ham, Utrecht (NL)

(72) Inventors: Georgo Angelis, Oss (NL); Nicolaas Simon Willem Den Haak, Zwijndrecht (NL); Petrus Matheus Josephus Knapen, Tilburg (NL); Bernardus Johannes Meijer, Tilburg (NL); Andreas Clemens Van Der Ham, Utrecht (NL)

(73) Assignee: AKTIEBOLAGET SKF, Gothenburg (SE)

( * ) Notice: Subject to any disclaimer, the term of this patent is extended or adjusted under 35 U.S.C. 154(b) by 613 days.

(21) Appl. No.: 14/923,474

(22) Filed: Oct. 27, 2015

(65) Prior Publication Data
US 2016/0126807 A1 May 5, 2016

(30) Foreign Application Priority Data
Oct. 29, 2014 (GB) .................. 1419229.8

(51) Int. Cl.
*H02K 7/18* (2006.01)
*F16C 19/38* (2006.01)
(Continued)

(52) U.S. Cl.
CPC ......... *H02K 7/1846* (2013.01); *F16C 19/386* (2013.01); *F16C 41/004* (2013.01); *H02K 7/061* (2013.01)

(58) Field of Classification Search
CPC ...... H02K 7/18; H02K 7/1846; H02K 7/1853; H02K 7/1807; H02K 7/061; H02K 7/063; F16C 41/004; F16C 41/00
(Continued)

(56) References Cited

U.S. PATENT DOCUMENTS 5,115,738 A   5/1992  Gruetzmacher et al.
5,585,711 A * 12/1996  Kemner ................ B60K 25/08
                                              310/156.28
(Continued)

FOREIGN PATENT DOCUMENTS

DE    102006044562 A1   4/2008
DE    102011082270 A1   3/2013
(Continued)

OTHER PUBLICATIONS

Lithium Handbook, Panasonic, Dated Feb. 2002, "The Micro Generating System for a Watch", pages not specified.

*Primary Examiner* — Mang Tin Bik Lian
*Assistant Examiner* — Alexander Moraza (57) ABSTRACT

A bearing arrangement including a rotating part and a non-rotating part. The rotating part is configured to rotate relative to the non-rotating part with an essentially horizontal rotation axis. The arrangement is provided with an energy generating system, comprising at least one micro generator module. The micro generator module includes a housing, an eccentric mass mounted so as to be rotatable around an eccentric shaft in the housing, and a generator unit configured to generate electrical energy using the rotation of the eccentric shaft. The energy generating system is mounted to the rotating part of the arrangement.

15 Claims, 7 Drawing Sheets

(51) Int. Cl.
*F16C 41/00* (2006.01)
*H02K 7/06* (2006.01)

(58) Field of Classification Search
USPC .......... 310/67 R, 75 C, 75 R, 81; 290/3; 362/192
See application file for complete search history.

(56) References Cited

U.S. PATENT DOCUMENTS

| | | | | |
|---|---|---|---|---|
| 6,386,731 | B1 * | 5/2002 | Cheng | B60Q 1/326 362/192 |
| 8,564,148 | B1 | 10/2013 | Novak | |
| 2001/0000305 | A1 * | 4/2001 | Murray | B60Q 1/326 362/478 |
| 2004/0042206 | A1 * | 3/2004 | Luo | B60Q 1/326 362/192 |
| 2005/0140201 | A1 * | 6/2005 | Wang | B60B 7/20 301/37.101 |
| 2006/0236712 | A1 * | 10/2006 | Vazquez | A47C 21/048 62/263 |
| 2009/0021021 | A1 * | 1/2009 | Grenier | F03D 15/00 290/55 |
| 2011/0016980 | A1 * | 1/2011 | Plavan | F16C 19/52 73/672 |

FOREIGN PATENT DOCUMENTS

| | | | |
|---|---|---|---|
| EP | 1120887 A2 | 8/2001 | |
| GB | 1576619 A | 10/1980 | |
| JP | H11125244 A | 5/1995 | |
| WO | 2014108169 A1 | 7/2014 | |
| WO | WO 2014108169 A1 * | 7/2014 | ........... F16C 33/723 |
| WO | 2014/154259 A1 | 10/2014 | |
| WO | 2014154259 A1 | 10/2014 | |

* cited by examiner

BEARING DEVICE WITH ENERGY HARVESTING MEANS

CROSS REFERENCE TO RELATED APPLICATION

This is a Non-Provisional Patent Application, filed under the Paris Convention, claiming the benefit of Great Britain (GB) Patent Application Number 1419229.8, filed on 29 Oct. 2014 (29.10.2014), which is incorporated herein by reference in its entirety.

FIELD OF THE INVENTION

The invention relates a bearing device provided with an energy harvesting means.

BACKGROUND OF THE INVENTION

The document WO 2014/108169 A1 relates to an end cap for a bearing assembly configured to be attached to a rotatable part of the bearing. A pendulum unit is attached to the centre axis of the end cap and is adapted to oscillate between two positions under the influence of gravity such that energy can be generated by an oscillation of the pendulum unit.

Further, it is known to provide energy harvesting devices in various parts of the bearings, wherein the generator is configured to interact with a rotating target ring, encoder wheel or tone wheel such that the relative rotation of different parts of the bearing creates an oscillating current in a coil, which can be rectified for further use.

Further, it is known from other fields of technology, e.g. from watches, to use a micro generating system that converts the human movement into electric energy. Micro generating systems comprise at least an eccentric mass, a miniaturized claw pole generator, and an energy storage, wherein a gear box may be optionally provided between the eccentric mass and the generator.

The document DE 10 2006 044 562 A1 discloses a further generator unit using the oscillating gravitational force for driving a pendulum to create energy for measuring tire pressure for vehicles.

The known systems for energy harvesting based on gravitational forces in bearings have a limited scope of applicability because the oscillation amplitude of the pendulum has to be limited by stops. Further, the dynamics of the pendulum strongly depends on the centrifugal force and therefore on the speed of rotation of the bearing such that it is difficult to adapt the design of the pendulum to the intended field of application.

On the other hand, energy harvesting devices based on magnetic interaction are sensitive to external magnetic fields and the efficiency strongly depends on the precision of the gap between a rotating target ring and the yoke of a generator which is difficult to maintain in many fields of application.

SUMMARY OF THE INVENTION

The invention seeks to overcome the drawbacks of the prior art by providing a bearing arrangement including an energy generating system which is cost saving, robust and scalable.

The invention relates to a bearing arrangement including a rotating part and a non-rotating part, wherein the rotating part is configured to rotate relative to the non-rotating part with an essentially horizontal rotation axis.

It is proposed that the energy generating system comprises at least one micro generator module including a housing, an eccentric mass mounted so as to be rotatable around an eccentric shaft in the housing, and a generator unit configured to generate electrical energy from the rotation of the eccentric shaft.

The micro generator module with the separate generator housing may be easily mounted at suitable places on the rotating part of the bearing assembly, is robust and versatile. In particular, the energy generating system is modular in the sense that multiple micro generating modules may be used in a system and attached to the rotating part of the bearing if necessary.

In a preferred embodiment of the invention, the eccentric shaft of the micro generator modules is arranged in a radial direction with regard to the axis of rotation of the bearing assembly as a whole. In other words, the eccentric shaft axis of rotation is essentially perpendicular to the bearing axis of rotation. As a consequence, the centrifugal forces generated by the rotation of the bearing do not affect the dynamics of the eccentric mass, which only depends on the gravitational force. The gravitational force oscillates as a consequence of the rotation of the rotating part when considering the local coordinate system of the rotating part of the bearing assembly. The amplitude of the gravitational force component acting on the eccentric mass is maximum if the rotation axis is horizontal. However, the invention is not limited to horizontal rotation axes and could be applied to axes deviating from the horizontal direction as well as long as the amplitude of the oscillating component of the gravity is strong enough.

Further, it is proposed to use housings of the micro generating system which are essentially cylindrical, wherein the radially outer surface of the cylindrical housings may be optionally provided with O-rings preventing the sliding of the micro generating modules within their accommodation.

Further, it is proposed that the generator system comprises multiple micro generator units as described above, arranged in an arc-shaped outer housing configured to be attached to the rotating part of the bearing assembly. The curvature of the arc-shaped plastic housing can be adapted to the bearing to which the system shall be applied. The modular nature of the energy generating system facilitates the adaptation to different bearing types in that only the outer housing has to be adapted to the mounting environment and to the number of micro-generating systems to be accommodated.

Further, it is proposed that the outer housing of the energy generating system includes a circuit board with electronic devices driven by the energy generated by the micro generating system and optionally with energy storage means such as a capacitor or the like. The devices mounted on the printed circuit board may include a microprocessor, temperature sensors, pressure sensors, acceleration sensors, vibration sensors, acoustic emission sensors and/or wireless transmitters to transmit the data calculated by the microcontroller to the outside.

Alternatively, the energy generating system may be provided in addition and separate from a unit for transmitting the signals to the outside.

In the preferred embodiment of the invention, the bearing assembly is configured as a railway axle bearing and the energy generator assembly is mounted in an end cap of the axle bearing. Further details on the sensor system are disclosed e.g. in WO 2014/154259, which is included herein by reference.

The above embodiments of the invention as well as the appended figures show multiple characterizing features of the invention in specific combinations. The skilled person will easily be able to consider further combinations or sub-combinations of these features in order to adapt the invention to his specific needs.

DETAILED DESCRIPTION OF THE EMBODIMENTS

Figure 1:
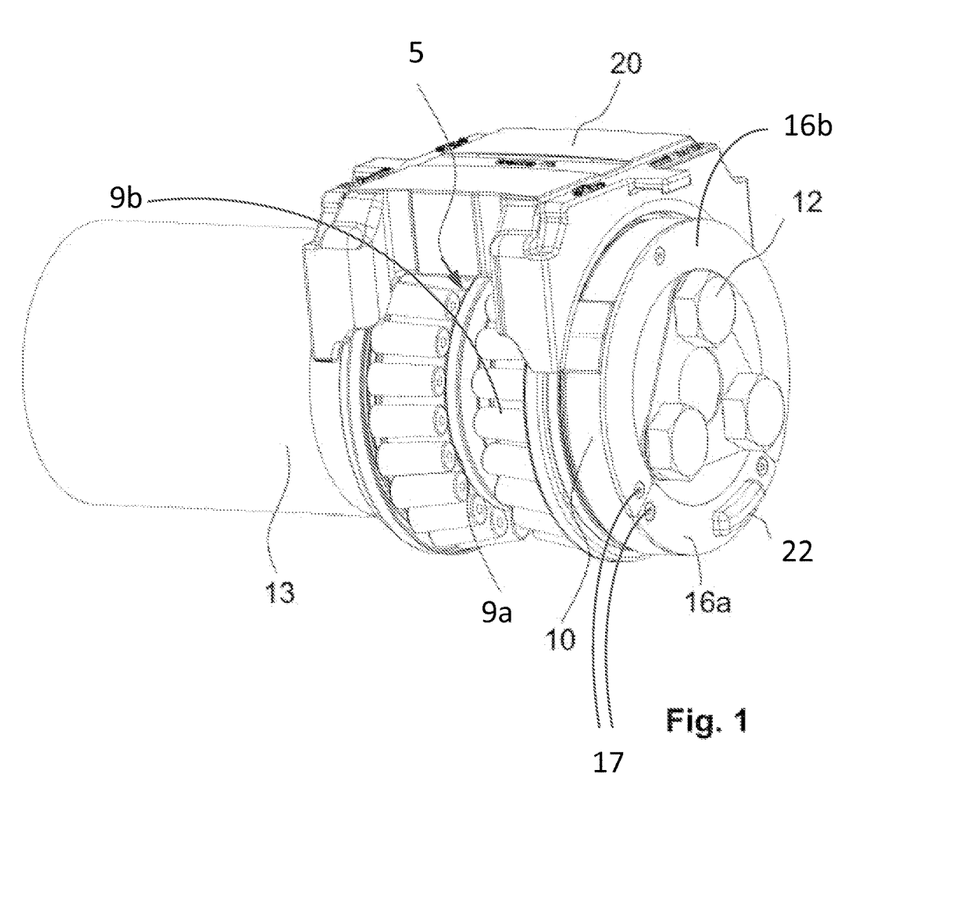
FIG. 1 is a railway axle bearing unit provided with an end cap equipped with an energy generating system according to the invention.
Figure 2:
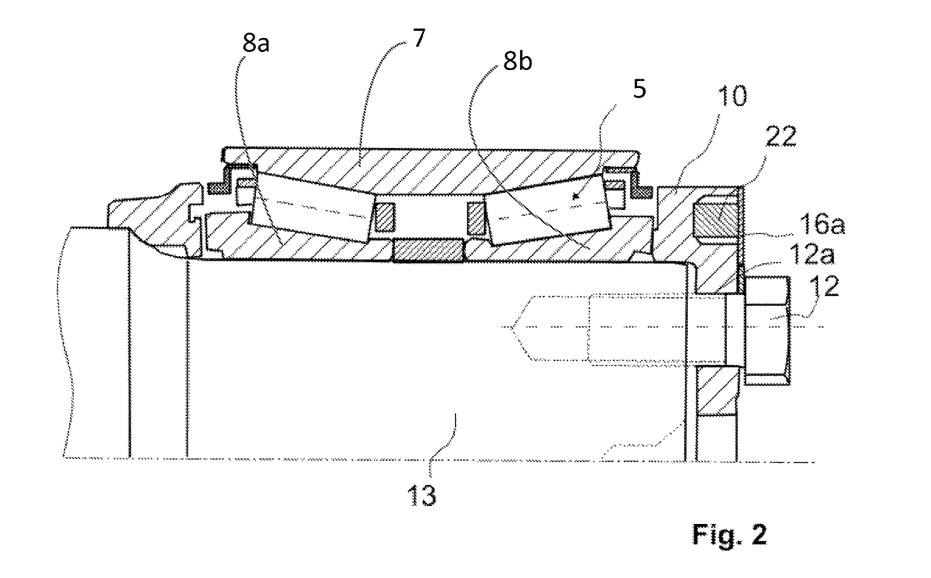
FIG. 2 is a sectional view of the bearing unit according to FIG. 1.

FIGS. 1 and 2 show a railway axle bearing unit including an end cap 10 fixed with three bolts 12 on an axial end face of an axle 13 so as to preload and retain a bearing 5. The bearing is double-row taper roller bearing in the depicted example, comprising a non-rotating outer ring 7 which is mounted in a housing 20 known as a saddle adapter. The bearing further has first and second inner rings 8a, 8b which are mounted to the rotational axle 13. Between the outer ring 7 and the first and second inner rings 8a, 8b, first and second rows 9a, 9b of tapered rollers are accommodated.

The end cap 10 comprises a solid metal base part and arc-shaped cover plates 16a, 16b fixed to the metal base part by means of screws 17.

Figure 3:
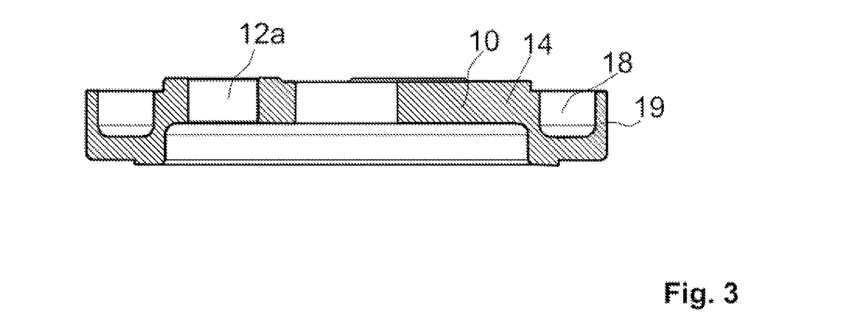
FIG. 3 is a sectional view of a body of the end cap in FIG. 2.

The metal base part 14 is illustrated in a cross-sectional view in FIG. 3. An outer side of the metal base part 14 facing away from the bearing unit 5 in the assembled configuration is provided with an angular, groove-like recess 18 which is symmetric with respect to a centre of rotation of the end cap 10. The recess 18 is delimited by a metal wall 19 of substantially constant thickness on the radially outer side and by a solid bulk body of a base part 14 on the radially inner side.

The cover plates 16a, 16b cover the groove-like recess 18 which is machined into the base part 14 around its entire circumference and holes 12a for the bolts 12 and for the screws fixing the cover plates 16a, 16b are provided for assembly and mounting of the end cap 10.

As illustrated in FIG. 2, the recess accommodates a sensor unit 22 underneath the cover plate 16a. The sensor unit 22 includes a micro-processor, a transmitter with an antenna part projecting through a window over the cover plate 16a, sensors and means for storing identification information and other information relating to the operation of the bearing.

The cover plate 16b covers the energy generating system according to the invention, which supplies the energy needed by the sensor unit 22.

Figure 4:
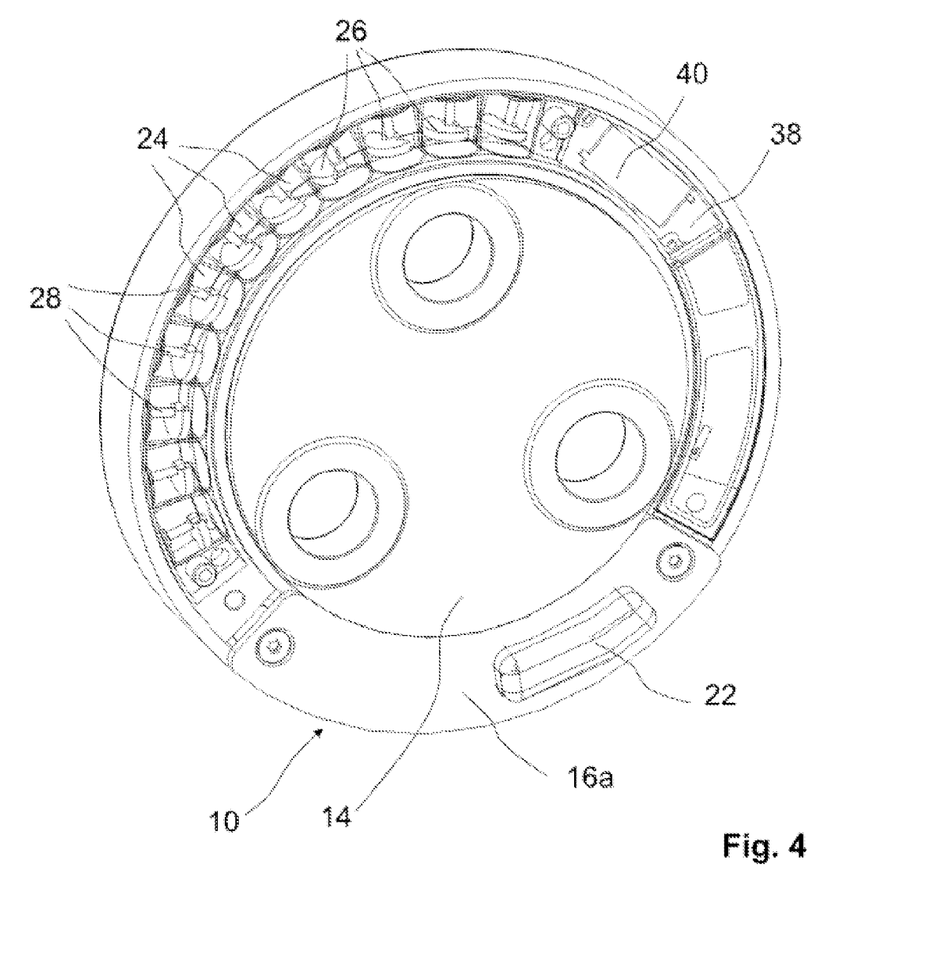
FIG. 4 is a view of the end cap with the energy-generating system according to the invention with some cover elements removed or illustrated as transparent.

FIG. 4 illustrates the end cap 10 with the cover plate 16b removed. The energy generating system includes a plurality of micro-generators or micro generator modules 24, each having an eccentric mass 26 at an eccentric shaft 28 carrying the eccentric mass 26. The eccentric shafts 28 are aligned radially with regard to the rotation axis of the bearing in the mounted configuration of the end cap 10.

Figure 5:
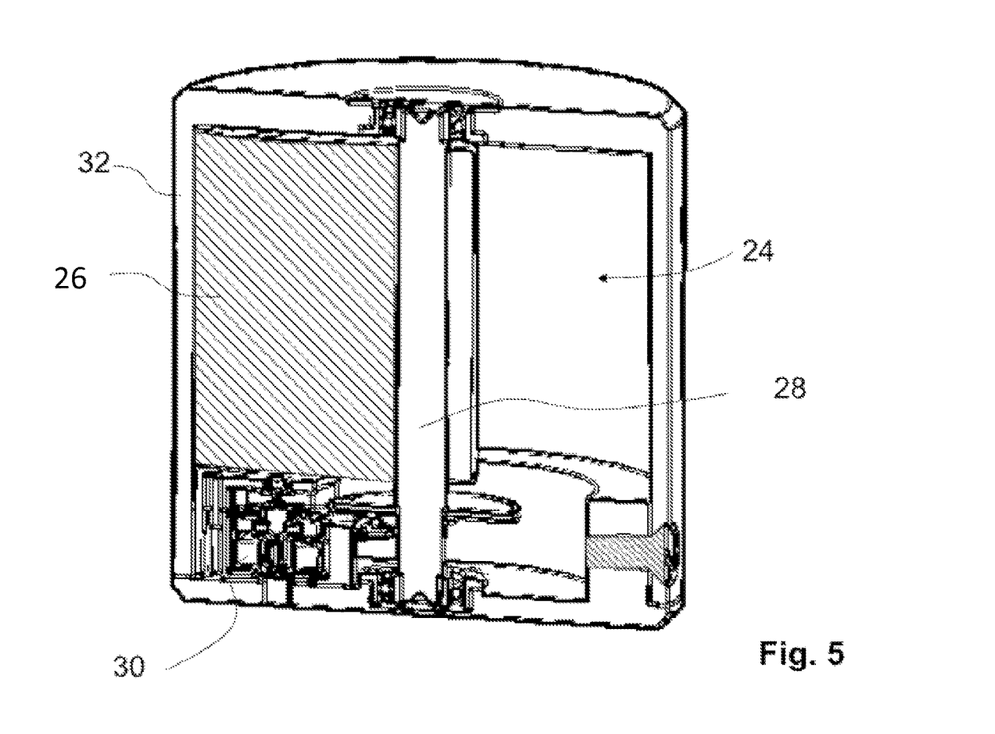
FIG. 5 is a sectional view of an example of a micro generator module of the energy generating system according to the invention.

A further example of a micro generator module according to the invention is illustrated in more detail in FIG. 5. The eccentric shaft 28 is connected via gears forming a transmission to a generator 30. The generator may be executed as a claw pole generator comprising a magnetic rotor and a number of claw poles. The magnetic rotor is coupled to the eccentric shaft 28, through the transmission, and generates electric current via electromagnetic induction in the known manner. The generator 30 and the eccentric shaft 28 are accommodated a substantially cylindrical micro-generator housing 32 such that the mechanical parts are protected against dust and dirt.

As the end cap 10 rotates (about a horizontal axis), two forces act on the eccentric mass 26: centrifugal force and gravitational force. Constant rotation generates a constant centrifugal force on the eccentric mass in a constant direction (local coordinate system). This force will not excite the eccentric mass 26 and shaft 28 to rotate and generate energy, and should therefore be decoupled from the system. This is achieved in that the eccentric mass 26 and shaft 28 have an axis of rotation which is perpendicular to the bearing axis of rotation. The gravitational force is constant, but changes direction (local coordinate system). This change in direction excites the eccentric mass, causing the eccentric shaft 28 to spin and generate energy. Thus, the micro generator is arranged so as to be predominantly sensitive to gravitational force, by using the gravity force component that is perpendicular to the centripetal force.

Figure 6:
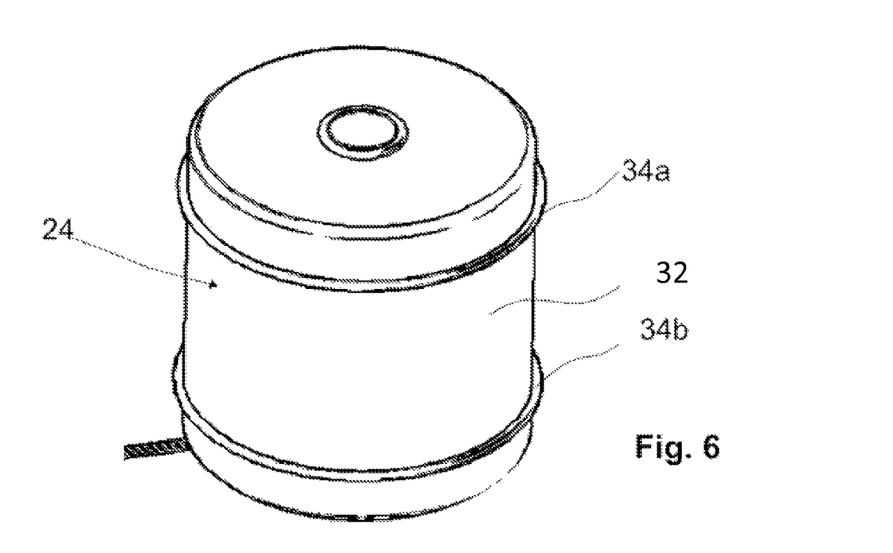
FIG. 6 is a perspective view of a micro generator module according to FIG. 5.

The micro-generator housing 32 is illustrated in a perspective view in FIG. 6. Two O-rings 34a, 34b are arranged on a circumferentially outer surface of the micro-generator housing 32 in order to avoid a slipping and play within the accommodating housing 36 (FIG. 7) of the micro-generator units.

Figure 7:
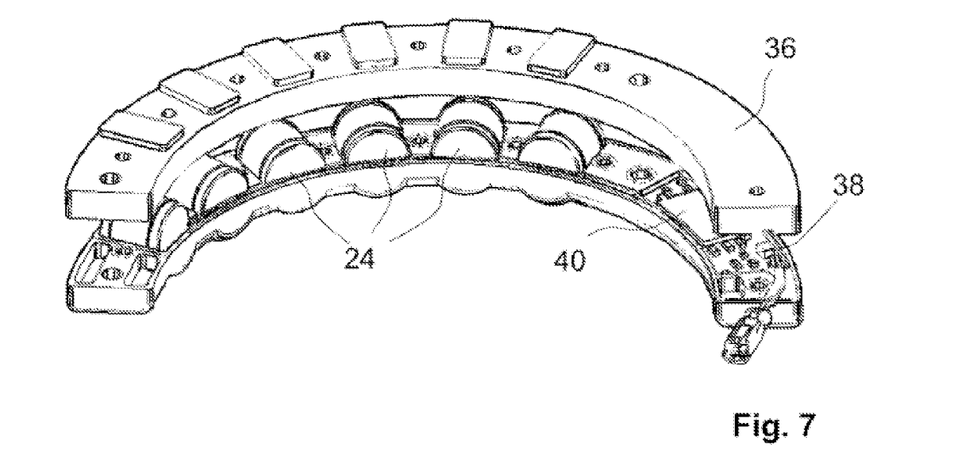
FIG. 7 is an exploded assembly view of an energy generating system according to the invention comprising micro generators as shown in FIGS. 5 and 6.

The accommodating housing 36 of the energy generating system according to the invention is illustrated in further detail in FIG. 7. The housing 36 has an upper part, a lower part and is substantially arc-shaped following the curvature of the groove 18. The two parts of the housing 36 are shaped such that the micro generator modules 24 and a printed circuit board 38 carrying a super-capacitor 40 are stably fixed. The printed circuit board 38 may be further provided with suitable rectifiers and control circuits for controlling the charging of the super-capacitor 40 or other energy storage means.

Figure 8:
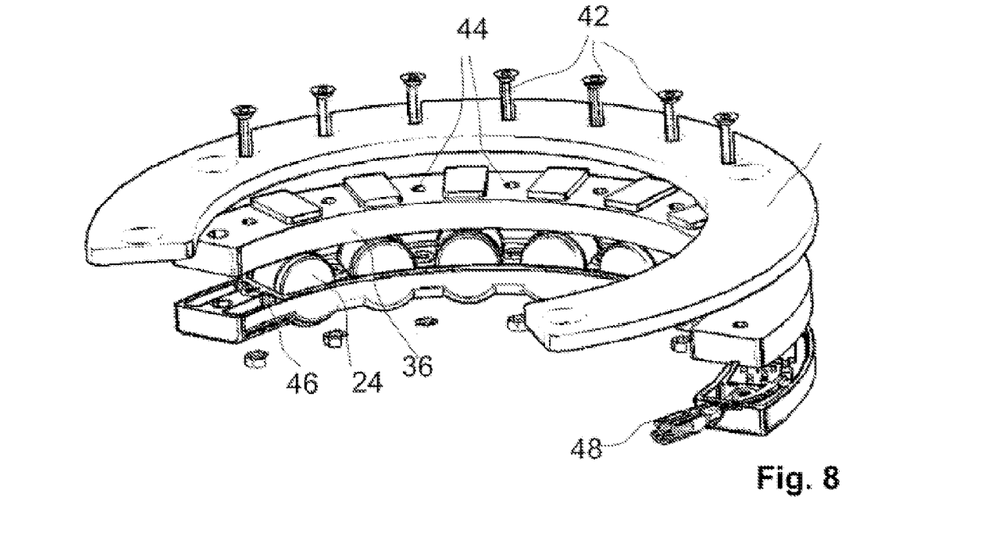
FIG. 8 illustrates the assembly of the energy generating system according to the FIG. 7 and the attachment thereof to cover plates of the bearing unit.

As illustrated in FIG. 8, the accommodating housing 36 is fixed to the cover plate 16b by means of screws 42 which further hold the two parts of the housing 36 together. The screw holes 44 in the housing 36 and the connecting portions 46 of the housing 36 where the two housing parts are connected, and a hole through which an electric cable with a connector 48 passes are securely sealed by overmolded or fitted rubber elements, O-rings or the like.

Figure 9:
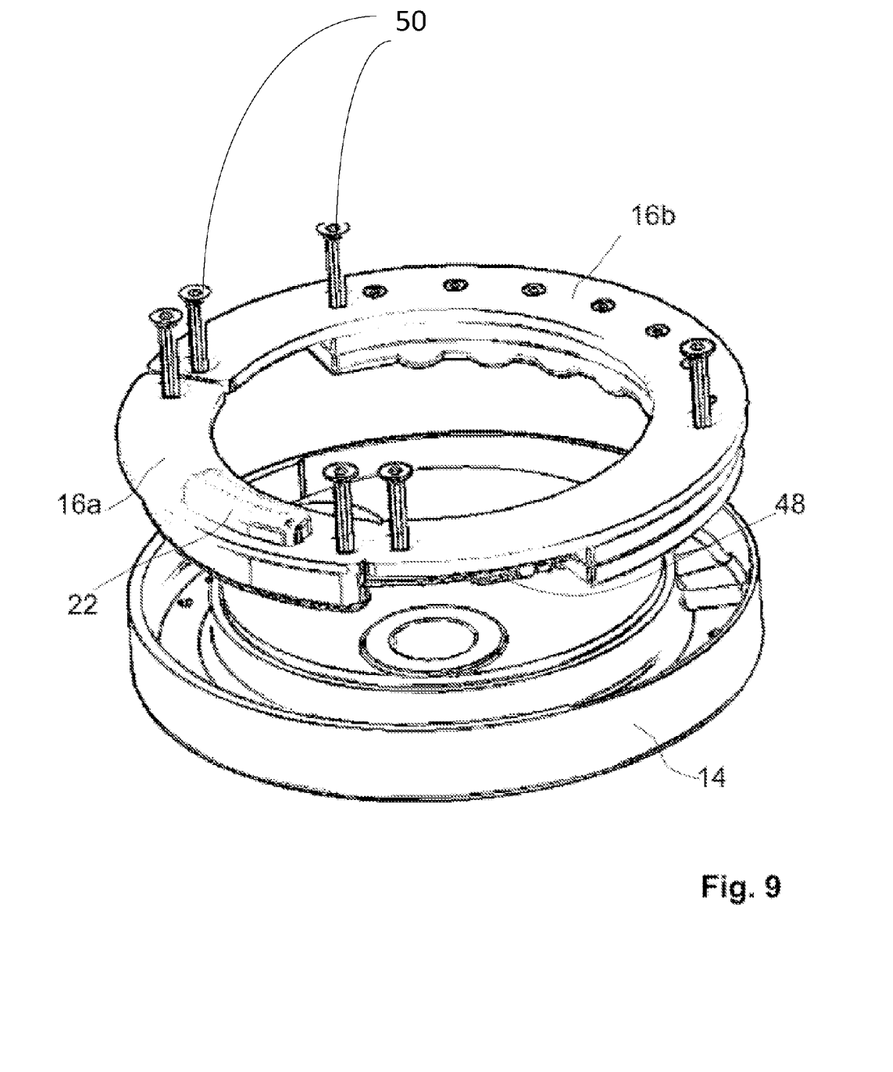
FIG. 9 is an exploded assembly view illustrating the final assembly of the energy generating system in an end cap according to the invention.

After having fixed the generator system to the cover plate 16b and the sensor unit 22 to the cover plate 16a and having connected a connector 48 of the electric cable to a corresponding connector of the sensor unit, the cover plates 16a, 16b are mounted on the body part 14 of the end cap 10, as illustrated in FIG. 9, by means of screws 50.

Figure 10:
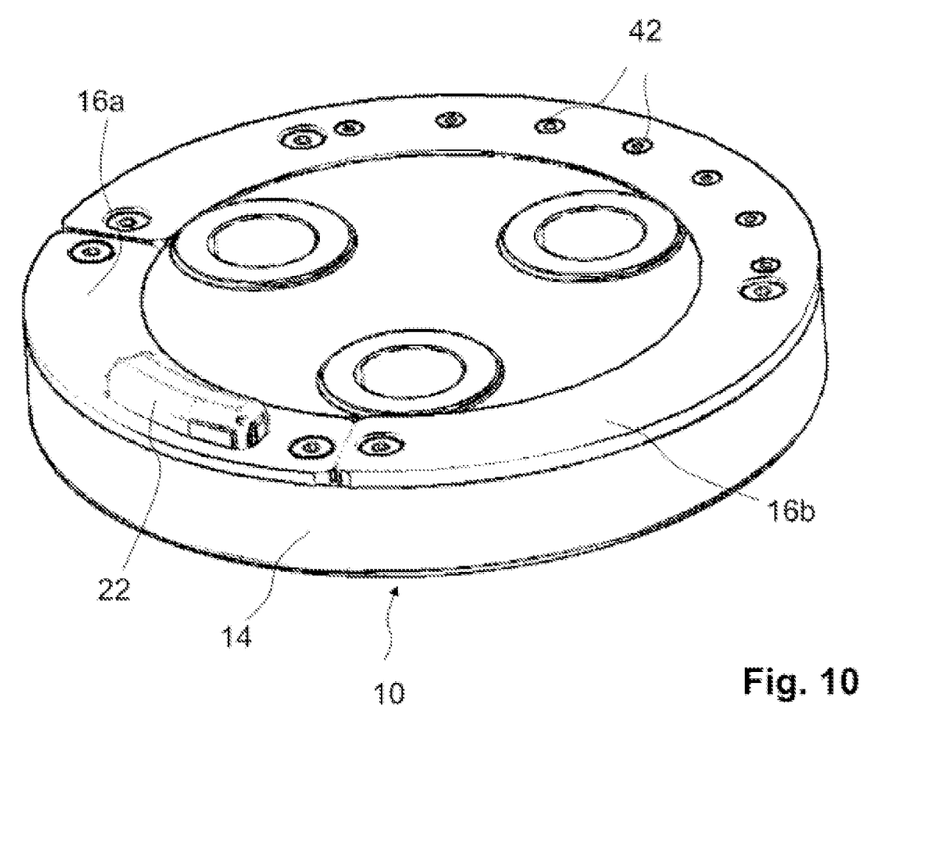
FIG. 10 is a perspective view of the end cap of FIG. 9 in its final configuration.

FIG. 10 illustrates the final configuration of the end cap 10 including the sensor unit 22 and the energy generating system covered by the cover plate 16b.

What is claimed is:

1. A bearing arrangement including:
    a rotating part; and
    a non-rotating part,
    wherein the rotating part is configured to rotate relative to the non-rotating part and around a bearing axis of rotation, the bearing axis of rotation extending in an axial direction,
    the arrangement being provided with an energy generating system that is mounted in connection with the rotating part,
    the energy generating system comprising at least one micro generator module, wherein the micro generator module includes:
        a housing,
        a shaft rotatably mounted in the housing, the shaft extending in a generally radial direction and the shaft having a shaft axis of rotation extending in the radial direction, and said shaft axis of rotation being perpendicular to the bearing axis of rotation;
        an eccentric mass fixedly mounted to the shaft in the housing such that the eccentric mass and shaft rotate as a unit around the shaft axis of rotation, and
        a generator unit in the housing, the generator unit coupled to the shaft and configured to generate electrical energy using the rotation of the shaft.

2. The bearing arrangement according to claim 1, the energy generating system further comprising a plurality of micro generator modules.

3. The bearing arrangement according to claim 2, wherein the energy generating system further comprises an accommodating housing connected to the rotatable part and micro generator modules arranged in the accommodating housing.

4. The bearing arrangement according to claim 3, wherein the accommodating housing further comprises at least one energy storage component for storing energy generated by the micro generator modules.

5. The bearing arrangement according to claim 4, wherein the energy storage component is a capacitor.

6. The bearing arrangement according to claim 3, wherein the accommodating housing further comprises at least one circuit board for managing the storage of the energy generated by the micro generator modules.

7. The bearing arrangement according to claim 3, wherein the energy generating system further includes a connector mounted to the accommodating housing and configured to transfer energy generated by the micro generator modules available outside of the accommodating housing.

8. The bearing arrangement according to claim 3, wherein the accommodating housing further comprises a sealing feature for sealing the energy generating system.

9. The bearing arrangement according to claim 2, wherein the housings of the micro generator modules are cylindrical.

10. The bearing arrangement according to claim 1, further comprising an end cap for exerting a preload on the bearing arrangement, wherein the energy generating system is arranged within the end cap.

11. The bearing arrangement according to claim 1, wherein the housing of the micro generator module is cylindrical, and the cylindrical housing comprises:
    a first base including a first surface and a second base including a second surface, the first and second surfaces located inside the housing, and
    the shaft is rotatably mounted to the first base and the second base such that the shaft and eccentric weight are positioned entirely inside the housing and the shaft.

12. An energy generating system arranged in an end cap adapted for use in a railway axle bearing unit, the energy generating system comprising:
    a bearing arrangement including:
    a rotating part;
    a non-rotating part,
    wherein the rotating part is configured to rotate relative to and around a bearing rotation axis, the bearing rotation axis extending in an axial direction; and
    the end cap mounted on the rotatable part and,
    at least one micro generator module mounted on the end cap,
    wherein the micro generator module includes:
        a housing positioned on the end cap,
        a shaft rotatably mounted in the housing, the shaft extending in a generally radial direction and the shaft having a shaft axis of rotation extending in the radial direction, and said shaft axis of rotation being perpendicular to the bearing axis of rotation;
        an eccentric mass fixedly mounted to the shaft in the housing such that the eccentric mass and shaft rotate as a unit around the shaft axis of rotation, and
        a generator unit in the housing, the generator unit connected to the shaft and configured to generate electrical energy using the rotation of the shaft.

13. A railway axle bearing unit comprising a bearing arrangement comprising:
    a rotating part;
    a non-rotating part,
    wherein the rotating part is configured to rotate relative to the non-rotating part and around a bearing rotation axis, the bearing rotation axis extending in an axial direction; and
    an energy generating system mounted to the rotating part,
    the energy generating system comprising at least one micro generator module, wherein the micro generator module includes:
        a housing,
        a shaft rotatably mounted in the housing, the shaft extending in a generally radial direction and the shaft having a shaft axis of rotation extending in the radial direction, and said shaft axis of rotation being perpendicular to the bearing axis of rotation;
        an eccentric mass fixedly mounted to the shaft in the housing such that the eccentric mass and shaft rotate as a unit around the shaft axis of rotation, and
        a generator unit in the housing, the generator unit coupled to the shaft and configured to generate electrical energy using the rotation of the shaft; and
        an end cap for exerting a preload on the bearing arrangement,
    wherein the energy generating system is arranged within the end cap, wherein the bearing arrangement is integrated into the railway axle bearing unit.

14. The bearing arrangement according to claim 13, wherein the housing of the micro generator module is cylindrical, and the cylindrical housing comprises:
   a first base including a first surface and a second base including a second surface, the first and second surfaces located inside the housing, and
   the shaft is rotatably mounted to the first base and the second base such that the shaft and eccentric weight are positioned entirely inside the housing.

15. The bearing arrangement according to claim 12, wherein the housing of the micro generator module is cylindrical, and the cylindrical housing comprises:
   a first base including a first surface and a second base including a second surface, the first and second surfaces located inside the housing, and
   the shaft is rotatably mounted to the first base and the second base such that the shaft and eccentric weight are positioned entirely inside the housing.

\* \* \* \* \*